(12) United States Patent
Saha

(10) Patent No.: US 8,264,951 B2
(45) Date of Patent: Sep. 11, 2012

(54) RESILIENT PPP/ML-PPP SERVICES OVER MULTI-CHASSIS APS PROTECTED ROUTERS

(75) Inventor: Kajal Saha, Ottawa (CA)

(73) Assignee: Alcatel Lucent, Paris (FR)

( * ) Notice: Subject to any disclaimer, the term of this patent is extended or adjusted under 35 U.S.C. 154(b) by 372 days.

(21) Appl. No.: 12/000,961

(22) Filed: Dec. 19, 2007

(65) Prior Publication Data

US 2009/0161535 A1 Jun. 25, 2009

(51) Int. Cl.
*G01R 31/08* (2006.01)
(52) U.S. Cl. .......................... 370/219; 370/353
(58) Field of Classification Search ............... 370/221, 370/222, 219
See application file for complete search history.

(56) References Cited

U.S. PATENT DOCUMENTS

| | | | |
|---|---|---|---|
| 6,580,709 B1 | 6/2003 | Gorshe | |
| 6,956,816 B1* | 10/2005 | Alexander et al. | 370/222 |
| 7,170,854 B1 | 1/2007 | Orrell | |
| 7,363,534 B1* | 4/2008 | Krishnamurthy et al. | 714/13 |
| 7,376,078 B1* | 5/2008 | Amiocangioli et al. | 370/217 |
| 2003/0161262 A1* | 8/2003 | Hosoi | 370/228 |
| 2003/0212927 A1* | 11/2003 | Navar et al. | 714/47 |
| 2004/0100899 A1* | 5/2004 | Mahamuni | 370/216 |
| 2005/0180429 A1 | 8/2005 | Ghahremani et al. | |
| 2006/0198296 A1 | 9/2006 | Majee et al. | |
| 2007/0130077 A1 | 6/2007 | Jagadeesan | |
| 2007/0253327 A1* | 11/2007 | Saha et al. | 370/218 |
| 2009/0100193 A1* | 4/2009 | Natarajhan et al. | 709/239 |

FOREIGN PATENT DOCUMENTS

| | | |
|---|---|---|
| AU | 2003276499 A1 | 6/2004 |
| WO | 2004049609 A1 | 6/2004 |

OTHER PUBLICATIONS

"Types and characteristics of SDH network protection architectures; G. 841 (Oct. 1998)" ITU-T Standard in Force (I), International Telecommunication Union, Geneva, CH, No. G.841 ,Oct. 1, 1998, XP017401080.

* cited by examiner

*Primary Examiner* — Anh-Vu Ly
*Assistant Examiner* — Matthew Hopkins
(74) *Attorney, Agent, or Firm* — Kramer & Amado P.C.

(57) ABSTRACT

A system and method for resilient communication services under multi-chassis APS protected routers, including one or more of the following: an add-drop multiplexer; a working chassis; a plurality of working lines of communication between the add-drop multiplexer and the working chassis; a protection chassis; a plurality of protection lines of communication between the add-drop multiplexer and the protection chassis; and a multi-chassis APS control link between the working chassis and the protection chassis, wherein a plurality of active entities in the working chassis having state information send their state information to parallel inactive entities in the protection chassis by way of the multi-chassis APS, the active entities send changed state information to parallel inactive entities through the multi-chassis APS control link upon a state change in the active entities, and the inactive entities that were down request current state information from the active entities through the multi-chassis APS control link when the inactive entities that were down come back up after being down.

27 Claims, 4 Drawing Sheets

RESILIENT PPP/ML-PPP SERVICES OVER MULTI-CHASSIS APS PROTECTED ROUTERS

BACKGROUND OF THE INVENTION

1. Field of the Invention

This invention relates generally to point-to-point protocol (PPP) communications using automatic protection switching (APS).

2. Description of Related Art

In networking, the PPP is a data link protocol used to establish a direct connection between two nodes over serial cable, phone line, trunk line, cellular telephone, specialized radio links, or fiber optic links. Most Internet service providers use PPP for customers' dial-up access to the Internet. Two common encapsulated forms of PPP, Point-to-Point Protocol over Ethernet (PPPoE) or Point-to-Point Protocol over ATM (PPPoA), are used in a similar role with Digital Subscriber Line (DSL) Internet service.

Asynchronous Transfer Mode (ATM) is a cell relay, packet switching network and data link layer protocol which encodes data traffic into small fixed-sized cells. ATM provides data link layer services that run over Layer 1 links. ATM differs from other technologies based on packet-switched networks such as the Internet Protocol or Ethernet which use variable sized packets known as frames when referencing layer 2. ATM is a connection-oriented technology, in which a logical connection is established between the two endpoints before the actual data exchange begins.

PPP is often used to act as a data link layer protocol for connection over synchronous and asynchronous circuits. For such uses, PPP has largely superseded the older, non-standard Serial Line Internet Protocol (SLIP), and standards mandated by telephone companies such as Link Access Protocol, Balanced (LAPB) in the X.25 protocol suite. PPP was designed to work with numerous network layer protocols, including Internet Protocol (IP).

One approach to failure detection in routers used for PPP communications is APS. In distributed routing systems with APS protection on routers, multilink PPP (MLPPP or ML-PPP) is an extension to the PPP. MLPPP is a bandwidth-on-demand protocol that can connect multiple links between two systems as needed to provide bandwidth on demand. The technique is often called bonding or link aggregation.

For example, the two 64-Kbit/sec B channels of ISDN can be combined to form a single 128-Kbit/sec data channel. Another example would be to bind one or more dial-up asynchronous channels with a leased synchronous line to provide more bandwidth at peak hours of the day.

Many PPP and ML-PPP communications systems using APS routers experience a temporary data loss during an APS switch. This data loss is undesirable. Thus, there is a need for a mechanism and method that minimizes data loss in PPP/ML-PPP communications systems using APS routers during an APS switch.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

Multi-chassis MLPPP is a specific category within the broader category of MLPPP. In light of the present need for resilient PPP/ML-PPP services over multi-chassis APS protected routers, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

A multi-chassis APS switchover typically causes the APS protected port of a standby router to become active. In various exemplary embodiments, after a multi-chassis APS switchover, the PPP/MLPPP links or bundles over the APS port in a newly active router typically need to renegotiate all the PPP/MLPPP protocols with their peers. This often results in a significant period during an APS switchover when the transfer of data is interrupted. This interruption in the transfer of data is referred herein as a data outage.

In various exemplary embodiments, hundreds of PPP/MLPPP links or bundles run over an APS protected port. In such embodiments, the data outage that occurs during a multi-chassis APS switchover is often of such length that it causes one or more of the end applications relying on the PPP/MLPPP links or bundles to disconnect or terminate. Also, during an APS chassis or router reboot thousands of PPP/MLPPP links or bundles will be switched to the new router or chassis. For example, in applications pertaining to telephone calls, an APS switchover, including during router reboot, could result in the loss of a significant quantity of connected telephone calls. Various exemplary embodiments overcome such an excessive data outage over multi-chassis APS protected PPP/MLPPP links or bundles during an APS switchover.

In various exemplary embodiments, the PPP/MLPPP states of links or bundles from an active router are synchronized to a standby router. Accordingly, various exemplary embodiments eliminate a need to renegotiate PPP/MLPPP protocols upon a multi-chassis APS switchover. This results in a corresponding reduction of the length or significance of a data outage during a multi-chassis APS switchover. In various exemplary embodiments, as will be described in greater detail below, the extent of the reduction in the data outage during a multi-chassis APS switchover is significant.

Various exemplary embodiments are a system for resilient communication services under multi-chassis APS protected routers, including: an add-drop multiplexer; a working chassis; a plurality of working lines of communication between the add-drop multiplexer and the working chassis; a protection chassis; a plurality of protection lines of communication between the add-drop multiplexer and the protection chassis; and a multi-chassis APS control link between the working chassis and the protection chassis, wherein a plurality of active entities in the working chassis having state information send their state information to parallel inactive entities in the protection chassis by way of the multi-chassis APS, ones of said active entities send changed state information to parallel ones of said inactive entities through said multi-chassis APS control link upon a state change in said ones of said active entities, and ones of said inactive entities that were down request current state information from said active entities through said multi-chassis APS control link when said ones of said inactive entities that were down come back up after being down. The respective roles of the working and protection chassis in various exemplary embodiments are discussed further herein.

Various exemplary embodiments are a method for a resilient communication services over multi-chassis APS protected routers, including: all active entities in a working chassis having state information sending that state information to parallel inactive entities in a protection chassis through a multi-chassis APS control link that travels between the working chassis and the protection chassis; ones of said active entities sending changed state information from said working chassis to said protection chassis through said multi-chassis APS control link upon a state change of said ones of said active entities; and ones of said inactive entities requesting current state information from said all active entities through said multi-chassis APS control link when said ones of said inactive entities come back up after being down.

Various exemplary embodiments are a communication method for resilient communication services over multi-chassis APS protected routers, including: sending one or more packets with one or more sequence numbers from a plurality of active entities in a working chassis to a plurality of parallel inactive entities in a protection chassis by way of a multi-chassis APS control link passing between said working chassis and said protection chassis; receiving said one or more packets with said one or more sequence numbers at the plurality of parallel inactive entities in said protection chassis; sending one or more acknowledgements with said one or more sequence numbers from said plurality of parallel inactive entities in said protection chassis to said active entities in said working chassis through said multi-chassis APS control link; and receiving said one or more acknowledgements with said one or more sequence numbers at said active entities in said working chassis.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
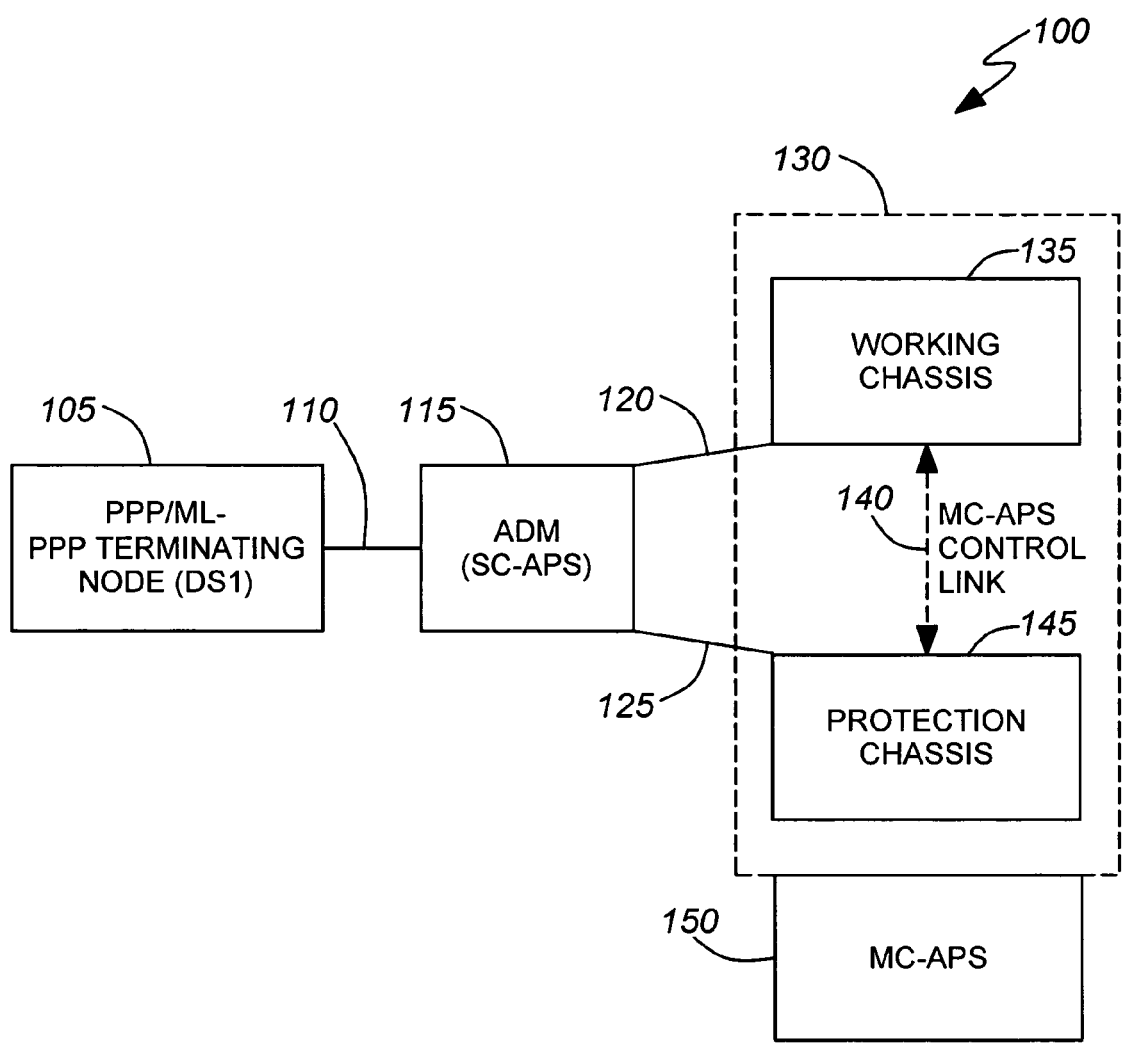
FIG. 1 is a schematic diagram of a first exemplary embodiment of a system for resilient PPP/ML-PPP services over multi-chassis APS protected routers.

Referring now to the drawings, in which like numerals refer to like components or steps, there are disclosed broad aspects of various exemplary embodiments.

FIG. 1 is a schematic diagram of a first exemplary embodiment of a system 100 for resilient PPP/ML-PPP services over multi-chassis APS protected routers. System 100 is an example involving one APS group. In system 100, a single working line (WL) 120 connects Add-Drop multiplexer (ADM) 115 with the working chassis 135. Likewise, a single protection line (PL) 125 connects ADM 115 with protection chassis 145. In various exemplary embodiments, the working chassis 135 and the protection chassis 145 are selected from the 7710 and 7750 models.

Accordingly, the APS group 130 includes a working circuit and a protection circuit. In various exemplary embodiments, the working circuit is a synchronous optical network (SONET)/synchronous digital hierarchy (SDH) physical port.

The terms working and active are used interchangeably herein under normal operating conditions. Likewise, the terms protection and inactive are used interchangeably herein. Further, it should be apparent that the roles respectively described herein for the two are reversed upon a switchover in a non-revertive mode. It should also be apparent that, in a revertive mode, the roles respectively described herein for the two are reversed back again as soon as a working circuit becomes available again.

In various exemplary embodiments, the APS group 130 including the working circuit and the protection circuit is configured in a SONET/SDH line terminating equipment (LTE)/chassis. Accordingly, system 100 includes working chassis 135 and protection chassis 145. This arrangement is sometimes referred to herein as a one plus one (1+1) arrangement. In system 100, DS1 105 represents a PPP/MLPPP terminating node or end point 1. DS1 105 is connected to ADM 115 by way of links, for example DS1, or bundles 110.

In system 100, the multi-chassis (MC) APS 1+1 feature enables the protection circuit and the working circuit to be configured in two different chassis or routers. Again, this is depicted by way of separate working chassis 135 and protection chassis 145.

The multi-chassis/router APS signaling is accomplished in system 100 between the working chassis 135 and the protection chassis 145 by way of MC-APS control link 140. The MC-APS control link 140 is a control link that usually passes directly between the working chassis 135 and the protection chassis 145. It should be apparent that, in various exemplary embodiments, the APS control link 140 passes indirectly between the working chassis 135 and the protection chassis 145. However, the MC-APS control link 140 does not pass between the working chassis 135 and the protection chassis 145 by way of the ADM 115. Accordingly, in various exemplary embodiments, the MC-APS control link 140 is an IP connection.

Based on the foregoing, the MC-APS feature 150 of system 100 protects against nodal or router failures in addition to the link and circuit failures discussed above. Accordingly, in the case of a failure or degradation of a signal in one physical link or circuit, the other circuit is able to quickly take over.

In various exemplary embodiments, the working chassis 135 represents a PPP/MLPPP end point 2 and the protection chassis 145 also represents the same PPP/MLPPP end point 2. Further, it should be noted that the references herein to PPP end point 1 in DS1 box 105 and PPP/MLPPP end point 2 in working chassis 135 and protection chassis 145 should also be understood to be references, in various exemplary embodiments, to PPP/MLPPP end points.

In various exemplary embodiments, hundreds of PPP/MLPPP links or bundles run over a single APS group 130. Further, in various exemplary embodiments, multiple APS groups are configured between the working chassis 135 and the protection chassis 145. In various exemplary embodiments, the PPP/MLPPP protocol is a link control protocol (LCP), an Internet protocol control protocol (IPCP), a bridge control protocol (BCP), and so on.

Figure 2:
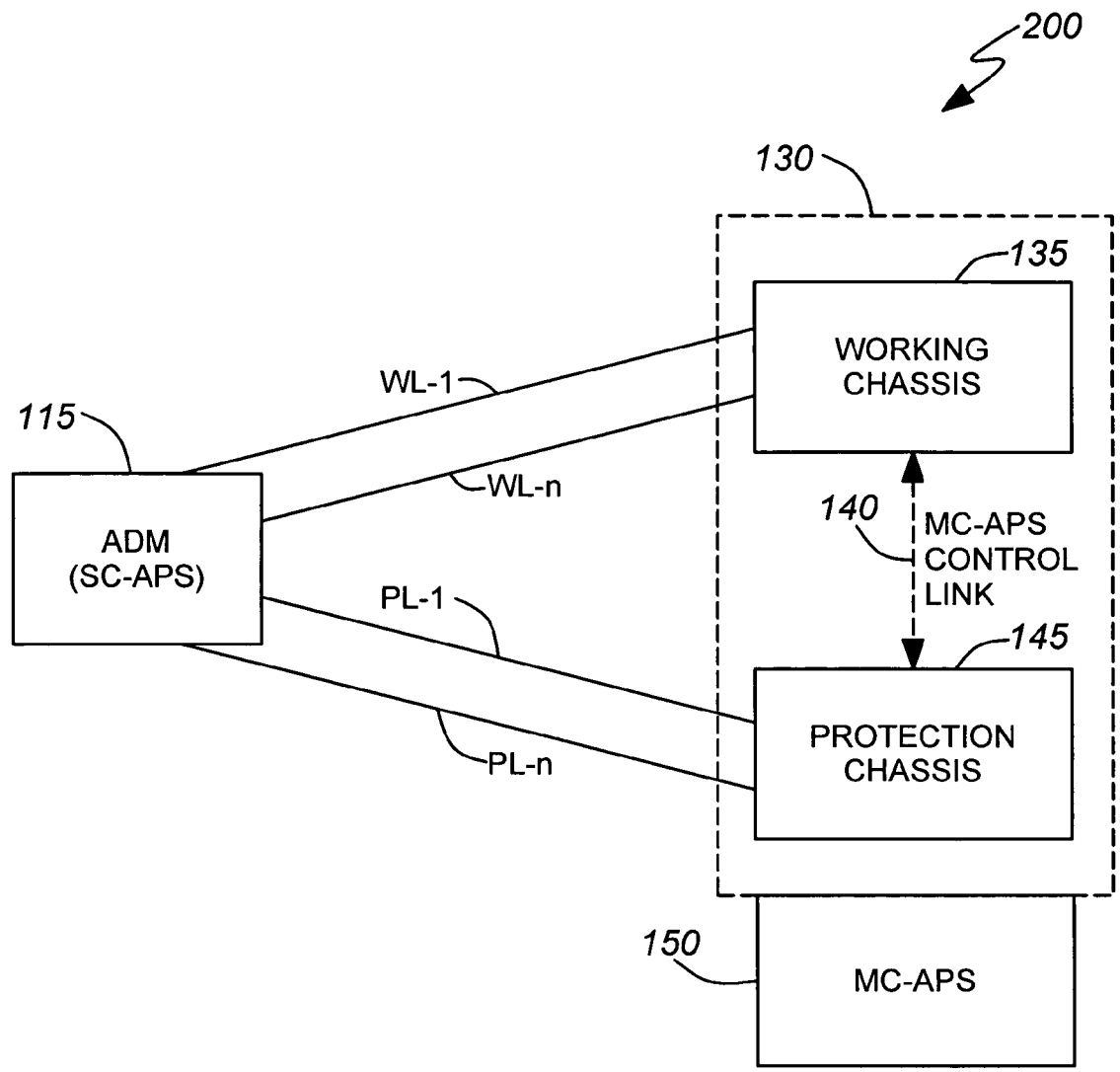
FIG. 2 is a schematic diagram of a second exemplary embodiment of a system for resilient PPP/ML-PPP services over multi-chassis APS protected routers.

FIG. 2 is a schematic diagram of a second exemplary embodiment of a system 200 for resilient PPP/ML-PPP services over multi-chassis APS protected routers. The ADM 115, APS group 130, working chassis 135, MC-APS control link 140, protection chassis 145, and MC-APS 150 in system 200 are essentially the same as described above in connection with system 100. Accordingly, common reference numbers are used between system 100 and system 200 when referring to these components.

System 200 includes a plurality of working lines WL-1 to WL-n. Likewise, system 200 includes a plurality of protection lines PL-1 to PL-n. Accordingly, it should be understood that n represents an integer variable greater than 1. The protection lines PL-1 to PL-n travel between ADM 115 and protection chassis 145 just as protection line 125 in system 100. Likewise, the working lines WL-1 to WL-n travel from ADM 115 to working chassis 135 just as working line 120 in system 100.

Each working line WL-1 to WL-n, and each protection line PL-1 to PL-n, corresponds to a port. Accordingly, each working line WL-1 to WL-n and each protection line PL-1 to PL-n corresponds to approximately 512 PPP entities because there are typically around 512 PPP/MLPPP entities in one channelized port in SONET/SDH. It should be apparent that other embodiments exist having other numbers of PPP/MLPPP entities.

In system 200, the PPP protocol states of the links or bundles over the active APS circuits from one chassis or router are synchronized with those of the related links or bundles over the inactive APS circuits in the other chassis or router. In various exemplary embodiments, the PPP state information is sent over the MC-APS control link 140 using a proprietary protocol. Accordingly, various exemplary embodiments ensure the reliable delivery of state information from one router to the other router.

In various exemplary embodiments, an inactive PPP/MLPPP entity on one router sends a request to the active entity of the other router to get the current PPP/MLPPP state information from the corresponding active entity of the other router. This will be discussed in greater detail below in connection with FIGS. 3 and 4.

After an MC-APS switchover, if the PPP/MLPPP protocol state of the synchronized data indicates an "open" state and the newly active physical link or bundle is operationally up, then the newly active PPP entity runs its finite state machine (FSM) based on the synchronized data. Accordingly, in various exemplary embodiments, a newly active physical link or bundle following an MC-APS switchover is able to achieve an operational state without renegotiating with its peer. Thus, in various exemplary embodiments, services are restored after an APS switchover much more quickly than embodiments where a renegotiation with a peer is necessary.

It typically takes approximately fifteen seconds to renegotiate each port in SONET/SDH where around 512 PPP/MLPPP entities are involved in each port. Accordingly, in an application including eight SONET/SDH ports it can take about two minutes to renegotiate the entire application. This occurs when simultaneous multiple port failures exist in connection with a router failure where all eight ports of the router are involved.

In comparison, exemplary system 200 is able to achieve a fully operational state of an eight port router in as little as eight seconds following an APS switchover. This corresponds to less than 2.5 milliseconds per PPP/MLPPP entity. It should be apparent that the operational benefits of achieving an operational state following an APS switchover in eight seconds versus two minutes is significant. This will be discussed in greater detail below.

Figure 3:
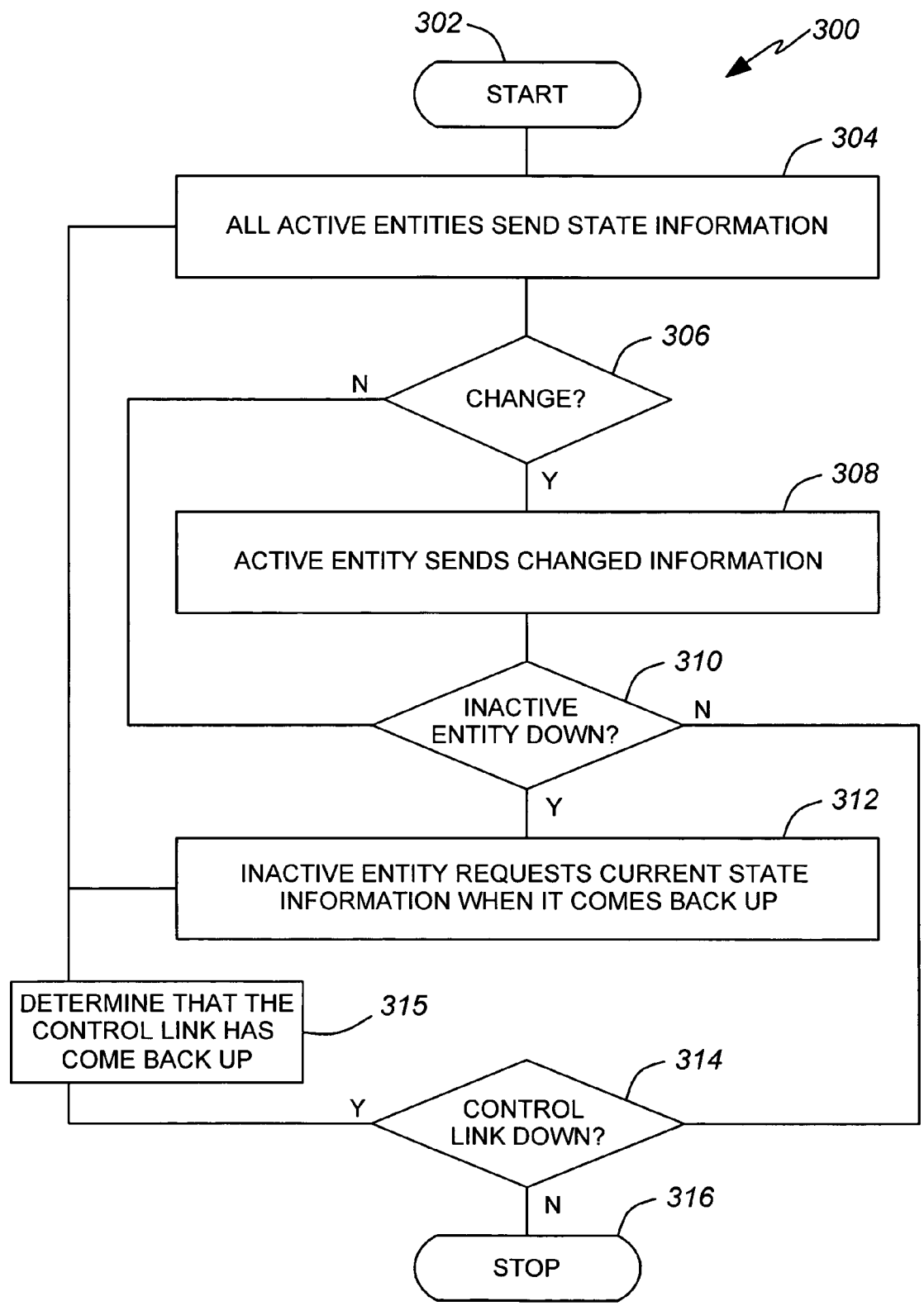
FIG. 3 is a flow chart of an exemplary embodiment of a method for resilient PPP/ML-PPP services over multi-chassis APS protected routers.

FIG. 3 is a flow chart of an exemplary embodiment of a method 300 for resilient PPP/ML-PPP services over multi-chassis APS protected routers. Method 300 starts in step 302 and continues to step 304. Step 304 is used as a system setup procedure for systems such as system 100 and system 200. In step 304, all active entities send the state information to their parallel protection entities. This communication, and all other communications described herein, occur in system 100 and system 200 between working chassis 135 and protection chassis 145 by way of MC-APS control link 140.

While the description of exemplary method 300 herein uses sequential language, it should be understood that, in various exemplary embodiments, different sequences are followed. It should also be understood that, various steps in exemplary method 300 occur, in some embodiments, to the exclusion of other steps in exemplary method 300. For example, in various exemplary embodiments, steps 306 and 308 occur but steps 310, 312, 314 do not occur. Similarly, in various exemplary embodiments, steps 310 and 312 occur, but steps 306, 308, 314 do not occur. Likewise, in various exemplary embodiments, step 314 occurs and returns to step 304, but steps 306, 308, 310, 312 are omitted. Accordingly, the following sequential description should be understood to describe only one possible sequence of a multitude of possible sequences of the various steps depicted for exemplary method 300.

Further, in various exemplary embodiments, all of the steps in exemplary method 300 or a subset of the steps in exemplary method 300 occur, but in a different order of sequence than the order depicted in exemplary method 300. For example, in another exemplary embodiment where all of the steps exists, step 314 occurs first, steps 310 and 312 occur next, and steps 306 and 308 occur last.

Following step 304, the method 300 proceeds to step 306. In step 306, an analysis is made whether there has been a change in any of the PPP/MLPPP state information on the active entity. If there has not been a change in the PPP/MLPPP state information on the active entity, the method 300 proceeds to step 310. If there has been a change in the PPP/MLPPP state information on the active entity, the method 300 proceeds to step 308.

In step 308, the active entity proactively sends the changed state information to the inactive entity. Thus, the PPP/MLPPP state information held on the inactive entity is maintained as current directly in response to changes in the PPP/MLPPP state information on the active entity. Accordingly, the communication necessary to achieve up to date state information on the inactive entity does not need to leave the APS group 130. Thus, such communications do not travel to the ADM 115. Rather, such a communication travels either directly or indirectly between the working chassis 135 and the protection chassis 145 through the MC-APS control link 140 within the MC-APS group 130.

Following step 308, the method 300 proceeds to step 310. In step 310, an evaluation is performed whether an inactive entity is down. When a determination is made in step 310 that no inactive entity is down, in other words, that all active entities are up, the method 300 proceeds to step 314. Conversely, when a determination is made in step 310 that an inactive entity is down, the method 300 proceeds to step 312.

In step 312, after an inactive entity that went down comes back up, that inactive entity requests current state information from the active entity. Following step 312, the method 300 returns to step 304.

At any time, when, the method 300 reaches step 314, a determination is made whether a control link has gone down. If a control link has gone down, a determination is made to that effect and the method 300 proceeds to step 315. In step 315, after the control link that was down has come back up, a determination is made to that effect. Then, after the control link subsequently comes back up the method 300 again returns to step 304 where the initial setup procedure is repeated. Because it cannot be known which, if any, of the active entities experienced a state change while the control link was down, this corresponds essentially to a start up procedure. Accordingly, when a control link has gone down, all active entities send their state information to the inactive entities.

Eventually, the method 300 will get to step 314 and a determination will be made that no control link has gone down. When a determination is made in step 314 that no control link has gone down, the method 300 proceeds to step 316 where the method 300 stops.

According to the foregoing, when the associated PPP/MLPPP protocol state information of the synchronized data indicates any other state than open, the newly active PPP/MLPPP entity starts renegotiating the PPP/MLPPP protocol. In this manner, traffic is restored even in the case where the PPP/MLPPP was not up, and in the case where the PPP/MLPPP state information was not fully synchronized, before an MC-APS switchover.

In other words, according to method 300, it is not necessary to renegotiate PPP/MLPPP protocol state information between the working chassis 135 and the protection chassis 145 if all of the synchronized data between the working chassis 135 and the protection chassis 145 is up by way of MC-APS control link 140. Otherwise, the PPP/MLPPP state information is renegotiated between the working chassis 135 and the protection chassis 145 just as in other systems that do not contain an MC-APS control link 140 for direct synchronization of information between the working chassis 135 and the protection chassis 145.

Put differently, system 100, system 200 and method 300 do not create any new problems. This is true because, whenever the advantages and benefits of system 100, system 200 and method 300 are not available, then system 100, system 200 and method 300 default to a less desirable approach where the PPP/MLPPP protocol state information is fully negotiated between the protection chassis 145 and the working chassis 135 without the benefit of direct communication there between by way of MC-APS control link 140.

It should be understood that, as used herein, the open state refers to the circumstance where, as part of bringing PPP/ML-PPP (for example LCP) up, when the layers successfully negotiate, the layer specific parameters are "open" or "up." The down state represents the converse.

Figure 4:
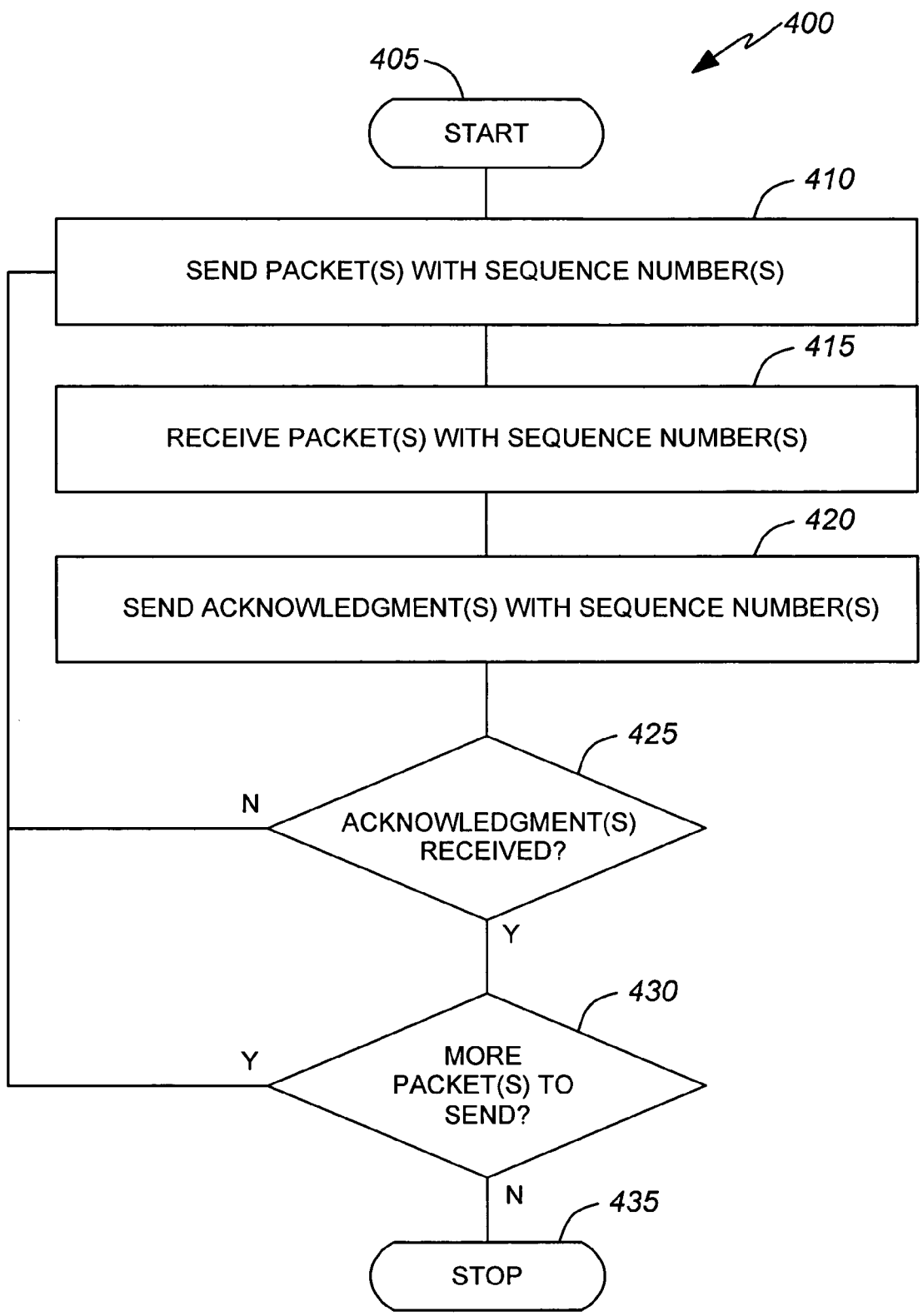
FIG. 4 is a flow chart of an exemplary embodiment of a method for sending state information in resilient PPP/ML-PPP services over multi-chassis APS protected routers.

FIG. 4 is a flow chart of an exemplary embodiment of a method 400 for sending state information in resilient PPP/ML-PPP services over multi-chassis APS protected routers. The method 400 starts in step 405 and proceeds to step 410.

In step 410, at least one packet is sent with a sequence number. It should be apparent that, in various exemplary embodiments, messages are bundled together. In such embodiments, less CPU is used. Accordingly, bundling messages together achieves an optimization of CPU resources. Accordingly, references herein to the various steps in method 400 in either the singular or the plural should be understood as references to both the plural and the singular in the alternative. This should also be understood to be a reference to various exemplary embodiments where packets are sent singularly or bundled.

Following step 410, the method 400 proceeds to step 415. In step 415 the packets sent in step 410 are received with their sequence numbers.

Following step 415, the method 400 proceeds to step 420. In step 420, an acknowledgement is sent that the packets were received, again with the corresponding sequence numbers. In various exemplary embodiments, an interval is set in which to receive acknowledgements sent in step 420. Accordingly, in various exemplary embodiments, steps 410, 415, 420 run repeatedly in sequence and/or in parallel until a preset interval has expired.

Following step 420, including the expiration of the predetermined interval in some embodiments, the method 400 proceeds to step 425. In step 425, an analysis is performed whether the acknowledgements, including the sequence numbers, have been received. If an acknowledgment with the corresponding sequence number is never received, then the method 400 returns to step 410, and the initial transmission is repeated.

Conversely, when an acknowledgement is successfully received with the corresponding sequence number(s), the method 400 proceeds from step 425 to step 430. In step 430, an analysis is made whether there are any more packets that need to be transmitted. When a determination is made in step 430 that at least one additional packet needs to be sent, the method 400 returns to step 410 and the steps of the method 400 are repeated. When a determination is made in step 430 that no additional packets need to be sent, the method 400 proceeds to step 435 where the method 400 stops.

According to the foregoing, state information, acknowledgements, message requests, and all other communications described in connection with method 300 and method 400 occur between the working chassis 135 and the protection chassis 145 by way of MC-APS control link 140. Accordingly, various exemplary embodiments achieve a quick restoration of services after an MC-APS switchover. Likewise, various exemplary embodiments reduce data outages during an MC-APS switchover.

The MC-APS 150 provides increased redundancy over single chassis APS (SC-APS). This in turn, affords the deployment of time-sensitive applications over MC-APS protected ports and circuits. Various exemplary embodiments achieve the foregoing benefits without ever renegotiating the whole MLPPP protocols.

Various implementations of the subject matter described herein have achieved recovery time at or below a maximum of one and a half seconds per port where the port(s) have around 500 entities. Typically, the various exemplary embodiments described herein recover from an APS switchover in about one second per port. Accordingly, various exemplary embodiments recover from a router failure with eight APS ports involving around 4000 PPP/MLPPP entities, for example, in as little as eight to twelve seconds.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for resilient communication services under multi-chassis Automatic Protection Switching (APS) protected routers, comprising:
   an add-drop multiplexer;
   a working chassis;
   a plurality of working lines of communication between the add-drop multiplexer and the working chassis;
   a protection chassis;
   a plurality of protection lines of communication between the add-drop multiplexer and the protection chassis; and
   a multi-chassis APS control link between the working chassis and the protection chassis, wherein
   active entities in the working chassis send their state information to parallel inactive entities in the protection chassis by way of the multi-chassis APS control link,
   said active entities send changed state information to the parallel inactive entities through said multi-chassis APS control link upon a state change in said active entities, and
   said parallel inactive entities that were down request current state information from said active entities through said multi-chassis APS control link when said inactive entities that were down come back up after being down, and Point-to-Point Protocol (PPP) states for the active entities in the working chassis are synchronized with PPP states for the parallel inactive entities in the protection chassis by receipt of an acknowledgment with a corresponding sequence number.

2. The system for resilient communication services over multi-chassis APS protected routers, according to claim 1, wherein said plurality of working lines and said plurality of protection lines operate under a multilink PPP.

3. The system for resilient communication services over multi-chassis APS protected routers, according to claim 1, wherein said plurality of active entities and said parallel inactive entities are PPP entities, a number of said plurality of active entities is at least 500, said working chassis and said protection chassis have ports, and a data outage during an APS switchover lasts less than one and a half seconds per port.

4. The system for resilient communication services over multi-chassis APS protected routers, according to claim 3, wherein said data outage during said APS switchover lasts less than 1.2 seconds per port.

5. The system for resilient communication services over multi-chassis APS protected routers, according to claim 1, wherein said working chassis and said protection chassis are Synchronous Optical NETworking/Synchronous Digital Hierarchy (SONET/SDH) physical ports.

6. The system for resilient communication services over multi-chassis APS protected routers, according to claim 1, wherein said working chassis and said protection chassis are configured in SONET/SDH line terminating equipment.

7. The system for resilient communication services over multi-chassis APS protected routers, according to claim 1, wherein the said working chassis and said protection chassis include parallel PPP communications end points.

8. The system for resilient communication services over multi-chassis APS protected routers, according to claim 1, wherein said multi-chassis APS control link is an Internet Protocol (IP) connection.

9. The system for resilient communication services over multi-chassis APS protected routers, according to claim 1, wherein a data outage during an APS switchover lasts less than 2.5 milliseconds per PPP entity.

10. The system for resilient communication services over multi-chassis APS protected routers, according to claim 1, wherein said multi-chassis APS control link sends communications via a proprietary protocol.

11. The system for resilient communication services over multi-chassis APS protected routers, according to claim 1, wherein said working chassis and said protection chassis each include an eight port router and each eight port router achieves a fully operational state following an APS switchover including all eight ports in less than ten seconds.

12. The system of claim 1, wherein each working line in the working chassis and each protection line in the protection chassis corresponds to a port.

13. A method for resilient communication services over multi-chassis Automatic Protection Switching (APS) protected routers, comprising:
   all active entities in a working chassis having state information sending that state information to parallel inactive entities in a protection chassis through a multi-chassis APS control link between the working chassis and the protection chassis;
   active entities sending changed state information from said working chassis to said protection chassis through said multi-chassis APS control link upon a state change of said active entities; and
   inactive entities requesting current state information from said all active entities through said multi-chassis APS control link when said inactive entities come back up after being down, wherein Point-to-Point Protocol (PPP) states for the active entities in the working chassis are synchronized with PPP states for the parallel inactive entities in the protection chassis by receipt of an acknowledgment with a corresponding sequence number.

14. The method for resilient communication services over multi-chassis APS protected routers, according to claim 13, wherein said state information is state information of communications under a multilink PPP.

15. The method for resilient communication services over multi-chassis APS protected routers, according to claim 13, wherein said working chassis and said protection chassis have ports, and a data outage during an APS switchover lasts less than one and a half seconds per port.

16. The method for resilient communication services over multi-chassis APS protected routers, according to claim 15, wherein said data outage during said APS switchover lasts less than 1.2 seconds per port.

17. The method for resilient communication services over multi-chassis APS protected routers, according to claim 13, wherein said working chassis and said protection chassis are SONET/SDH physical ports.

18. The method for resilient communication services over multi-chassis APS protected routers, according to claim 13, wherein said working chassis and said protection chassis are configured in SONET/SDH line terminating equipment.

19. The method for resilient communication services over multi-chassis APS protected routers, according to claim 13, wherein the said working chassis and said protection chassis include parallel PPP communications end points.

20. The method for resilient communication services over multi-chassis APS protected routers, according to claim 13, wherein said multi-chassis APS control link is an IP connection.

21. The method for resilient communication services over multi-chassis APS protected routers, according to claim 13, wherein said active entities and said inactive entities are PPP entities and a data outage during an APS switchover lasts less than 2.5 milliseconds per PPP entity.

22. The method for resilient communication services over multi-chassis APS protected routers, according to claim 13, wherein said multi-chassis APS control link sends communications via a proprietary protocol.

23. The method for resilient communication services over multi-chassis APS protected routers, according to claim 13, wherein said working chassis and said protection chassis each include an eight port router and each eight port router achieves a fully operational state following an APS switchover in less than ten seconds.

24. A communication method for resilient communication services over multi-chassis Automatic Protection Switching (APS) protected routers, comprising:
   sending one or more packets with one or more corresponding sequence numbers from a plurality of active entities in a working chassis to a plurality of parallel inactive entities in a protection chassis by way of a multi-chassis APS control link passing between said working chassis and said protection chassis;
   receiving said one or more packets with said one or more corresponding sequence numbers at the plurality of parallel inactive entities in said protection chassis;
   sending one or more acknowledgements with said one or more corresponding sequence numbers from said plurality of parallel inactive entities in said protection chassis to said active entities in said working chassis through said multi-chassis APS control link; and
   receiving said one or more acknowledgements with said one or more corresponding sequence numbers at said active entities in said working chassis, wherein Point-to-Point Protocol (PPP) states for the active entities in the working chassis are synchronized with PPP states for the parallel inactive entities in the protection chassis.

25. The method of claim 24, wherein each working line in the working chassis and each protection line in the protection chassis corresponds to a port.

26. A method for resilient communications services over multi-chassis Automatic Protection Switching (APS) protective routers, comprising:
   all active entities in a working chassis having state information sending that state information to parallel inactive entities in a protection chassis through a multi-chassis APS control link that connects the working chassis and the protection chassis;
   determining that a control link is down;
   determining that the control link that was down has come back up by receipt of an acknowledgment with a corresponding sequence number; and
   all active entities in the working chassis again sending the state information to the parallel inactive entities in the protection chassis through the multi-chassis APS control link, wherein Point-to-Point Protocol (PPP) states for the active entities in the working chassis are synchronized with PPP states for the parallel inactive entities in the protection chassis.

27. The method of claim 26, wherein each working line in the working chassis and each protection line in the protection chassis corresponds to a port.

\* \* \* \* \*